(12) United States Patent
Madson et al.

(10) Patent No.: US 7,481,287 B2
(45) Date of Patent: Jan. 27, 2009

(54) VEHICLE COOLING PACKAGE

(75) Inventors: Ricky Dean Madson, Waterloo, IA (US); Andy Blaine Appleton, Cedar Falls, IA (US); Clinton Lane Lafferty, Waterloo, IA (US); Ronnie Franklin Burk, Cedar Falls, IA (US); Dennis Aaron Bowman, Cedar Falls, IA (US); Thomas Frederick Tock, Denver, IA (US); Paul Thomas Bruss, Cedar Falls, IA (US); Charles Nicholas Warren, Cedar Falls, IA (US); Scott Keith Farlow, Cedar Falls, IA (US); Matthew Robert Oliver, Waterloo, IA (US)

(73) Assignee: Deere & Company, Moline, IL (US)

( * ) Notice: Subject to any disclaimer, the term of this patent is extended or adjusted under 35 U.S.C. 154(b) by 169 days.

(21) Appl. No.: 10/816,750

(22) Filed: Apr. 2, 2004

(65) Prior Publication Data

US 2005/0217907 A1    Oct. 6, 2005

(51) Int. Cl.
*B60K 11/04* (2006.01)
(52) U.S. Cl. .................. 180/68.1; 180/68.6
(58) Field of Classification Search ............ 180/68.1, 180/68.2, 68.4, 68.6, 69.2; 454/141, 142; 156/41, 51; 296/193.09, 193.1, 193.11
See application file for complete search history.

(56) References Cited

U.S. PATENT DOCUMENTS

| | | | |
|---|---|---|---|
| 3,358,787 A | 12/1967 | Bangasser et al. | |
| 3,786,891 A | 1/1974 | Vogelaar et al. | |
| 3,866,580 A | 2/1975 | Whitehurst et al. | |
| 3,868,992 A | 3/1975 | Getz et al. | |
| 3,982,600 A | 9/1976 | Gerresheim et al. | |
| 4,018,297 A * | 4/1977 | Haupt | 180/68.1 |
| 4,071,009 A | 1/1978 | Kraina | |
| 4,081,050 A | 3/1978 | Hennessey et al. | |
| 4,086,976 A | 5/1978 | Holm et al. | |
| 4,173,995 A * | 11/1979 | Beck | 165/51 |
| 4,339,014 A | 7/1982 | Berth et al. | |
| 4,382,481 A * | 5/1983 | Moore | 180/68.1 |
| 4,454,926 A | 6/1984 | Akins | |
| 4,757,858 A | 7/1988 | Miller et al. | |
| 5,240,373 A | 8/1993 | Mita et al. | |
| 5,495,909 A * | 3/1996 | Charles | 180/68.1 |
| 5,590,624 A * | 1/1997 | Emond et al. | 123/41.49 |
| 5,626,185 A * | 5/1997 | Gielda et al. | 165/41 |
| 5,689,953 A * | 11/1997 | Yamashita et al. | 60/316 |
| 5,709,175 A | 1/1998 | Carroll | |
| 6,068,675 A | 5/2000 | Tsuda et al. | |

(Continued)

*Primary Examiner*—Frank B Vanaman (57) ABSTRACT

A vehicle cooling package has a fan shroud mounted to a heat exchanger assembly. A diverter plate is mounted adjacent to the shroud and spaced therefrom with a fan interposed therebetween. A diverting surface of the shroud and the diverter plate are angled from the axis of the fan when the shroud and plate are assembled to the vehicle. A vehicle hood has upper and side surfaces each having air discharge apertures corresponding with the space between the diverting surface and the diverter plate when the hood is closed. The diverting surface and the diverter plate both extend fully to the hood assembly when the hood is closed. The angles of the diverting surface and the diverter plate closely match a natural discharge angle of the fan, so that air is discharged from the fan at a high velocity from under the hood through the air discharge apertures.

24 Claims, 8 Drawing Sheets

U.S. PATENT DOCUMENTS

| | | |
|---|---|---|
| 6,129,056 A | 10/2000 | Skeel et al. |
| 6,302,228 B1 * | 10/2001 | Cottereau et al. .......... 180/68.1 |
| 6,401,801 B1 | 6/2002 | Dicke |
| 6,523,507 B2 * | 2/2003 | Schmitz et al. .......... 123/41.55 |
| 6,622,783 B2 * | 9/2003 | Hitt et al. .................... 165/121 |
| 6,907,916 B2 * | 6/2005 | Koyama ...................... 165/67 |
| 2003/0136544 A1 * | 7/2003 | Albright et al. ............... 165/51 |

* cited by examiner

VEHICLE COOLING PACKAGE

FIELD OF THE INVENTION

The present invention relates generally to automotive vehicles such as work vehicles like agricultural tractors. More particularly, the present invention relates to such vehicles having internal combustion engines. Specifically, the present invention relates to cooling packages for such vehicles.

BACKGROUND OF THE INVENTION

Agricultural tractors in production today typically direct a significant portion of the cooling system fan exhaust under the hood enclosure and over the engine. A large amount of fan exhaust, both under the hood and outside the hood imparts heat to the operator station (cab). This happens due to the direction of the air being discharged from the cooling system and the fact that such air naturally tunnels through the hood enclosure toward the cab. This results in high heat loads on the cab, high under hood temperatures, significant backpressure on the fan and recirculation of heated air to the cooling system. Recirculation of heated air to the cooling system occurs due to the fact that heated air is discharged from the cooling system and is carried back to the intake of the cooling system via low air pressures at the cooling system intake and prevailing ambient air currents where it enters the system again and elevates the ambient temperature of the air the system ingests.

SUMMARY OF THE INVENTION

In view of the foregoing, it is an object of the invention to provide an improved cooling package for a work vehicle.

Another object of the invention is the provision of an improved cooling package which significantly reduces under hood temperatures as well as the heat load on the operator's station.

A further object of the invention is to provide an improved cooling package which is effective to expel a large quantity of the heated fan exhaust away from the vehicle and does not stir up excess dust and debris near the vehicle.

A still further object of the invention is to provide an improved cooling package which is quieter and more efficient than previously known systems.

An additional object of the invention is the provision of an improved cooling package which is compatible with existing vehicle and manufacturing technology.

The foregoing and other objects of the invention together with the advantages thereof over the known art which will become apparent from the detailed specification which follows are attained by a vehicle cooling package comprising: a heat exchanger assembly; a fan shroud mounted to the heat exchanger assembly, the fan shroud having a diverting surface; a diverter plate mounted adjacent to the fan shroud and spaced therefrom; a fan interposed between the fan shroud and the diverter plate; and, a vehicle hood enclosing the heat exchanger assembly, the fan shroud, the diverter plate, and the fan, the hood having at least one surface having air discharge apertures corresponding with the space between the diverting surface and the diverter plate when the hood is closed; wherein the diverting surface of the fan shroud and the diverter plate are each angled from the axis of the fan when the fan shroud and diverter plate are assembled to the vehicle, so as to closely match a natural discharge angle of the fan, and the diverting surface and the diverter plate both extend toward the hood assembly when the hood is closed so that air is discharged from the fan at a high velocity from under the hood through the air discharge apertures.

Other objects of the invention are attained by a fan shroud for a vehicle cooling fan comprising: a main body portion with a fan aperture therein, the fan aperture being defined by a circumferential wall extending outwardly from the main body portion of the fan shroud; a diverting surface extending from the circumferential wall opposite the main body portion at an angle to the axis of a fan when the fan is disposed in the fan aperture, the angle of the diverting surface corresponding to a natural discharge angle of the fan.

Still other objects of the invention are attained by a diverter plate for a vehicle cooling fan comprising: a main body portion angled from the axis of a fan disposed adjacent thereto at an angle corresponding to a natural discharge angle of the fan.

Further objects of the invention are attained by a vehicle hood assembly for enclosing the engine compartment and cooling package of a vehicle comprising: at least one surface having one or more air discharge apertures; wherein the air discharge apertures are located so as to correspond in location with a fan and one or more air diverting structures which extend to the hood surface(s) when the hood assembly is closed.

Still further objects of the invention are attained by a vehicle cooling package comprising: a heat exchanger assembly in fluid communication with an engine of a vehicle; a fan; a fan shroud mounted to the heat exchanger assembly, the fan shroud having a main body portion with a fan aperture therein, the fan aperture being defined by a circumferential wall extending outwardly from the main body portion of the fan shroud, a diverting surface extending from the circumferential wall opposite the main body portion at an angle to the axis of the fan when the fan is disposed in the fan aperture; a diverter plate mounted adjacent to the fan shroud and spaced from the fan shroud such that the fan can be interposed generally between the fan shroud and the diverter plate, the diverter plate further having a main body angled from the axis of the fan when the cooling package is assembled to the vehicle, diffuser screens interposed between the main body of the diverter plate and the diverting surface of the fan shroud when the fan shroud and diverter plate are assembled to the vehicle; and, a vehicle hood assembly having at least one surface having one or more air discharge apertures, the air discharge apertures being located so as to correspond in location with the space between the diverting surface of the fan shroud and the diverter plate when the hood assembly is mounted to the vehicle and closed; wherein the diverting surface of the fan shroud and the diverter plate both extend toward the hood assembly when the hood assembly is mounted to the vehicle and the hood is closed, and the angles of the diverting surface of the fan shroud and the diverter plate closely match a natural discharge angle of the fan so that air being discharged from the fan is discharged at a high velocity from under the hood through the air discharge apertures and discharge openings of the hood assembly.

In general, a vehicle cooling package has a fan shroud mounted to a heat exchanger assembly. A diverter plate is mounted adjacent to the shroud and spaced therefrom with a fan interposed therebetween. A diverting surface of the shroud and the diverter plate are angled from the axis of the fan when the shroud and plate are assembled to the vehicle. A vehicle hood has upper and side surfaces each having air discharge apertures corresponding with the space between the diverting surface and the diverter plate when the hood is closed. The diverting surface and the diverter plate both extend fully to the hood assembly when the hood is closed. The angles of the diverting surface and the diverter plate closely match a natural discharge angle of the fan, so that air is discharged from the fan at a high velocity from under the hood through the air discharge apertures.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
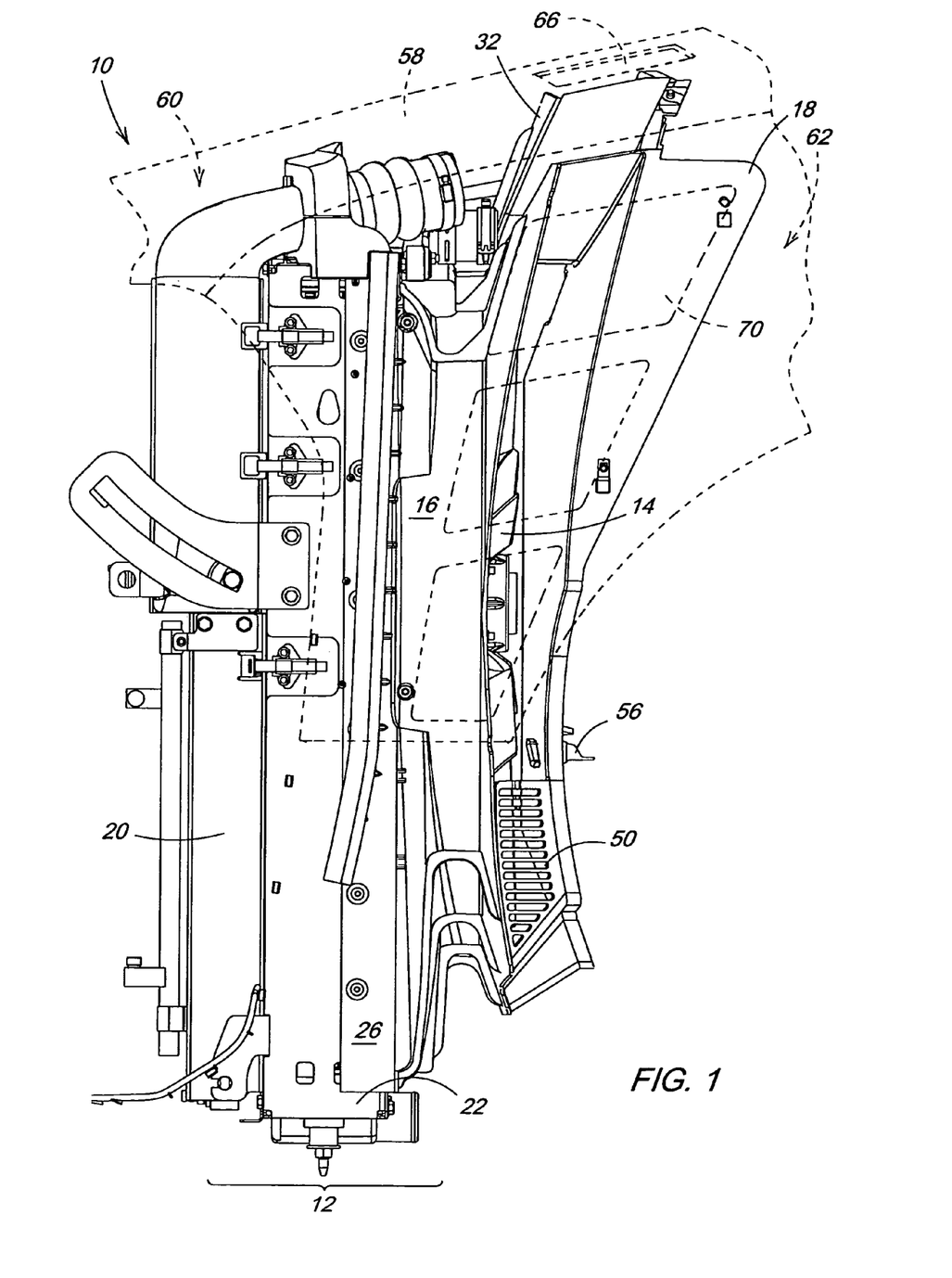
FIG. 1 is an elevational view of the cooling package according to the invention.
Figure 2:
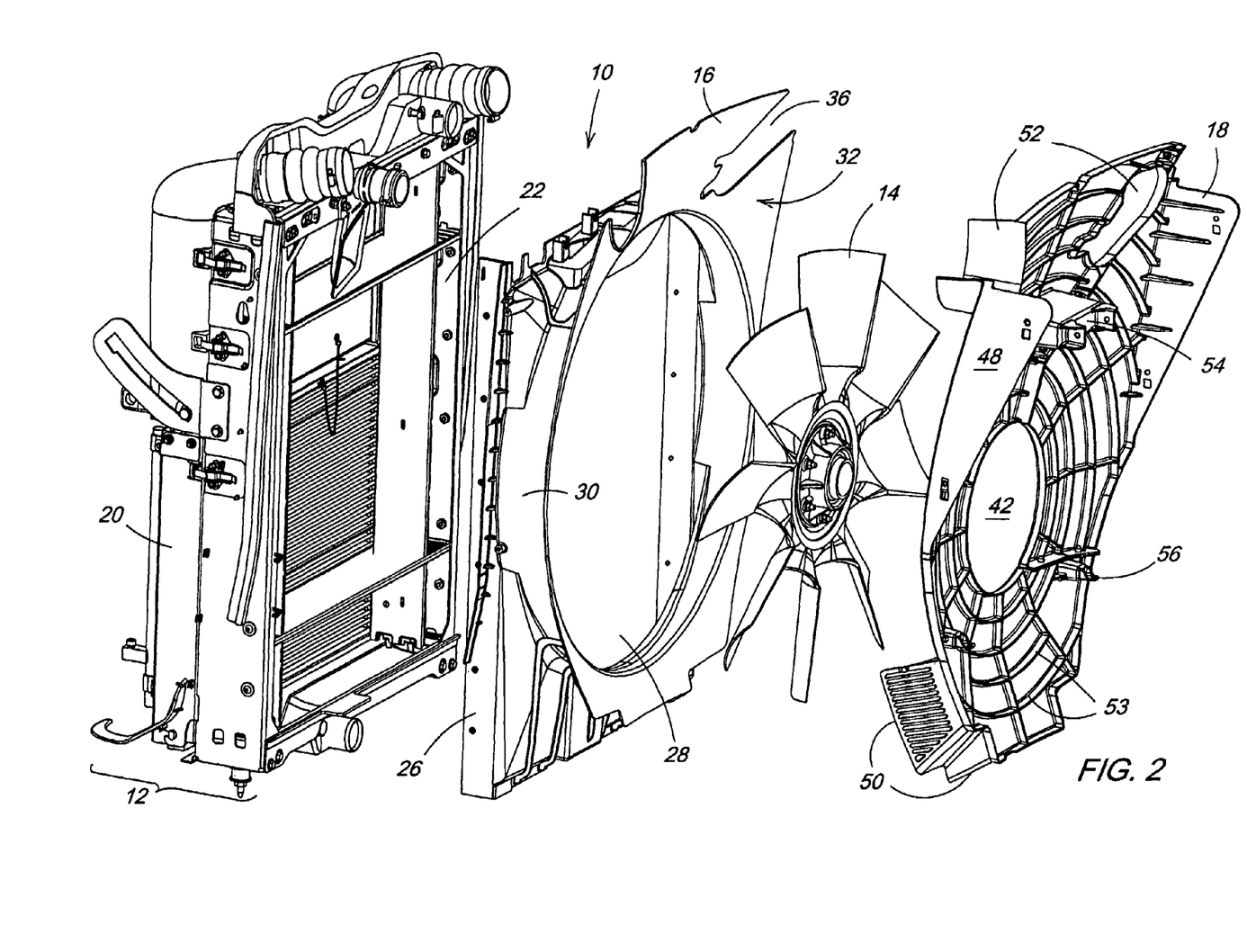
FIG. 2 is an exploded perspective view of the cooling package of FIG. 1.

With reference now to the drawings, and particularly to FIGS. 1 and 2, it can be seen that a vehicle cooling package according to the invention is designated generally by the numeral 10. As shown the cooling package 10 is comprised generally of a heat exchanger assembly 12, a fan 14, a fan shroud 16 and a diverter plate 18. The heat exchanger assembly 12 typically comprises one or more heat exchangers 20 in the form of charge air coolers, oil coolers, radiators, fuel coolers, air conditioning condensers or the like, mounted to a frame 22. The fan shroud 16 is preferably mounted to the frame 22 and thus provides a generally enclosed air passage between the heat exchanger(s) 20 and the fan 14, which is partially disposed within the shroud 16. The diverter plate 18 is mounted to the fan shroud 16, or other vehicle attachment points, but is sufficiently spaced from the shroud 16 such that the fan 14 is interposed generally between the shroud 16 and the diverter plate 18.

Figure 3:
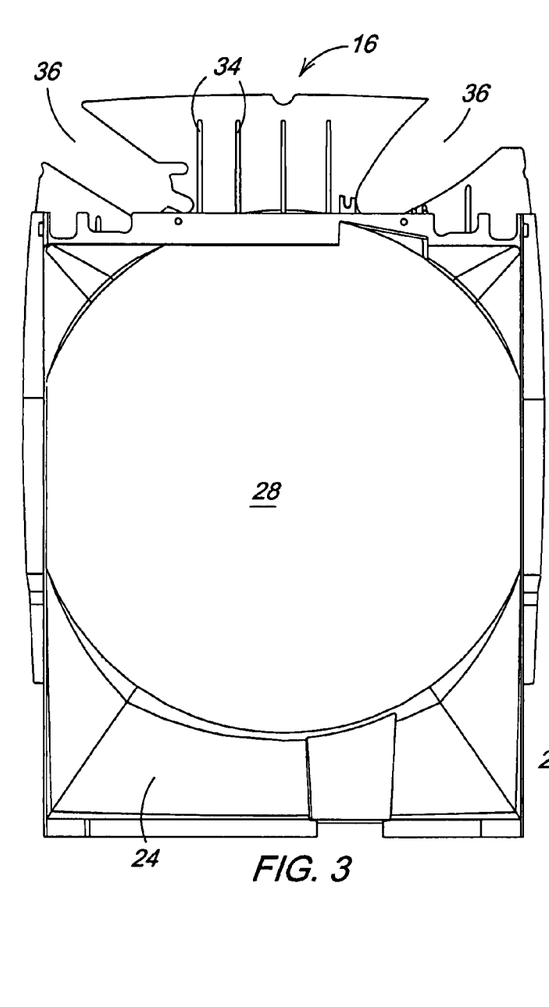
FIG. 3 is an elevational view of a first side of the fan shroud according to invention.
Figures 4, 5:
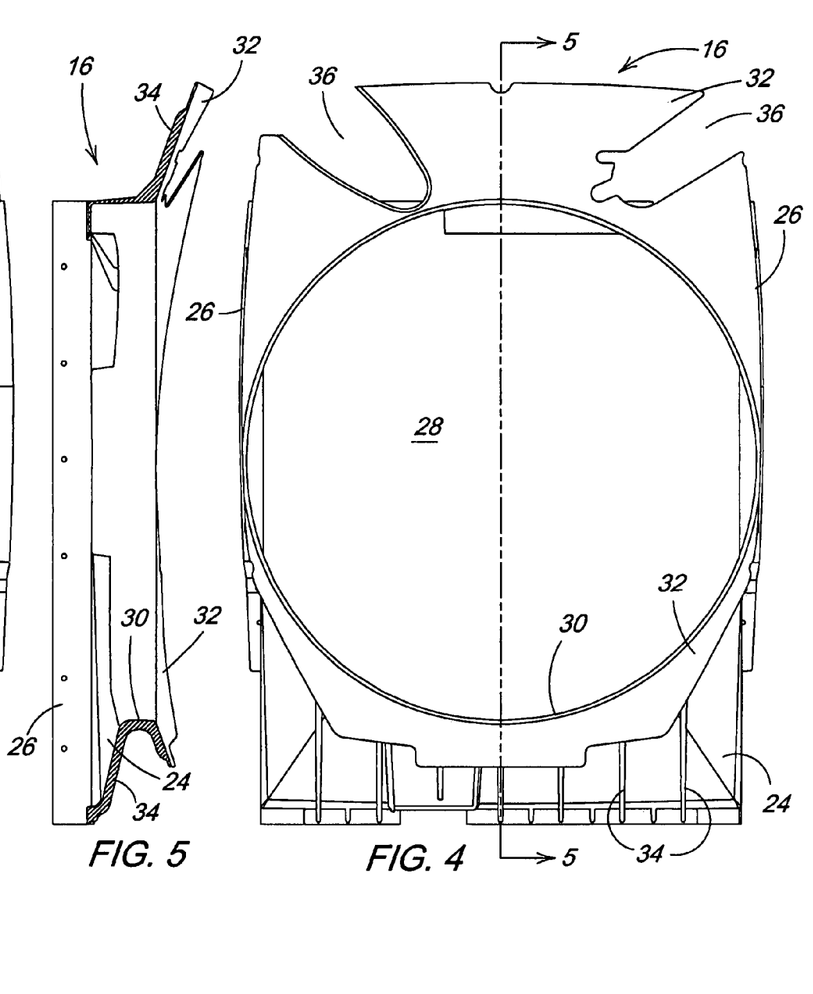
FIG. 4 is an elevational view of a second side of the fan shroud according to invention.
FIG. 5 is a cross-sectional view of the fan shroud of FIG. 4 taken along the line 5-5.

Referring now to FIGS. 3, 4 and 5 it can be seen that the fan shroud 16 is a unitary member preferably molded from an appropriate thermoset or thermoplastic material. The shroud 16 is defined generally by a main body portion 24 and preferably includes one or more mounting flanges 26 adapted to mateably engage the radiator frame 22. The shroud 16 further includes a fan aperture 28 in the main body portion 24. The fan aperture 28 is defined by a circumferential wall 30 extending outwardly, as shown, from the main body portion 24 of the shroud 16. For reasons which will become apparent as the description continues, a diverting surface 32 extends from the circumferential wall 30 opposite the main body portion 24 at an approximate 70 degree angle to the axis of the fan 14 when the fan 14 is disposed in the fan aperture 28. The diverting surface 32 and main body portion 24 may include stiffening ribs 34 to impart some degree of rigidity to the shroud 16. Plumbing recesses 36 may also be provided to facilitate routing of heat exchanger plumbing under the hood.

Figure 6:
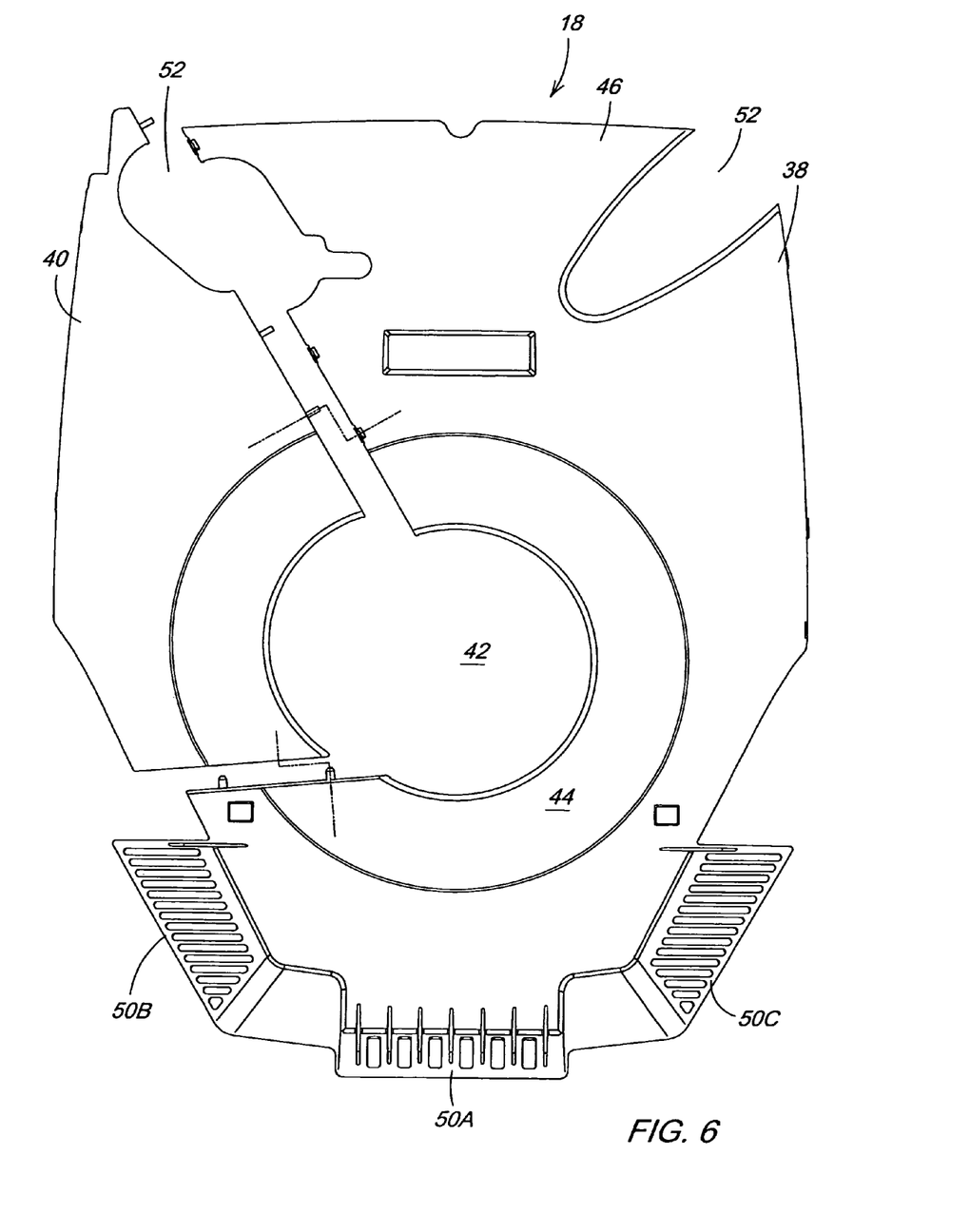
FIG. 6 is an exploded elevational view of a first side of the diverter plate according to invention.
Figure 7:
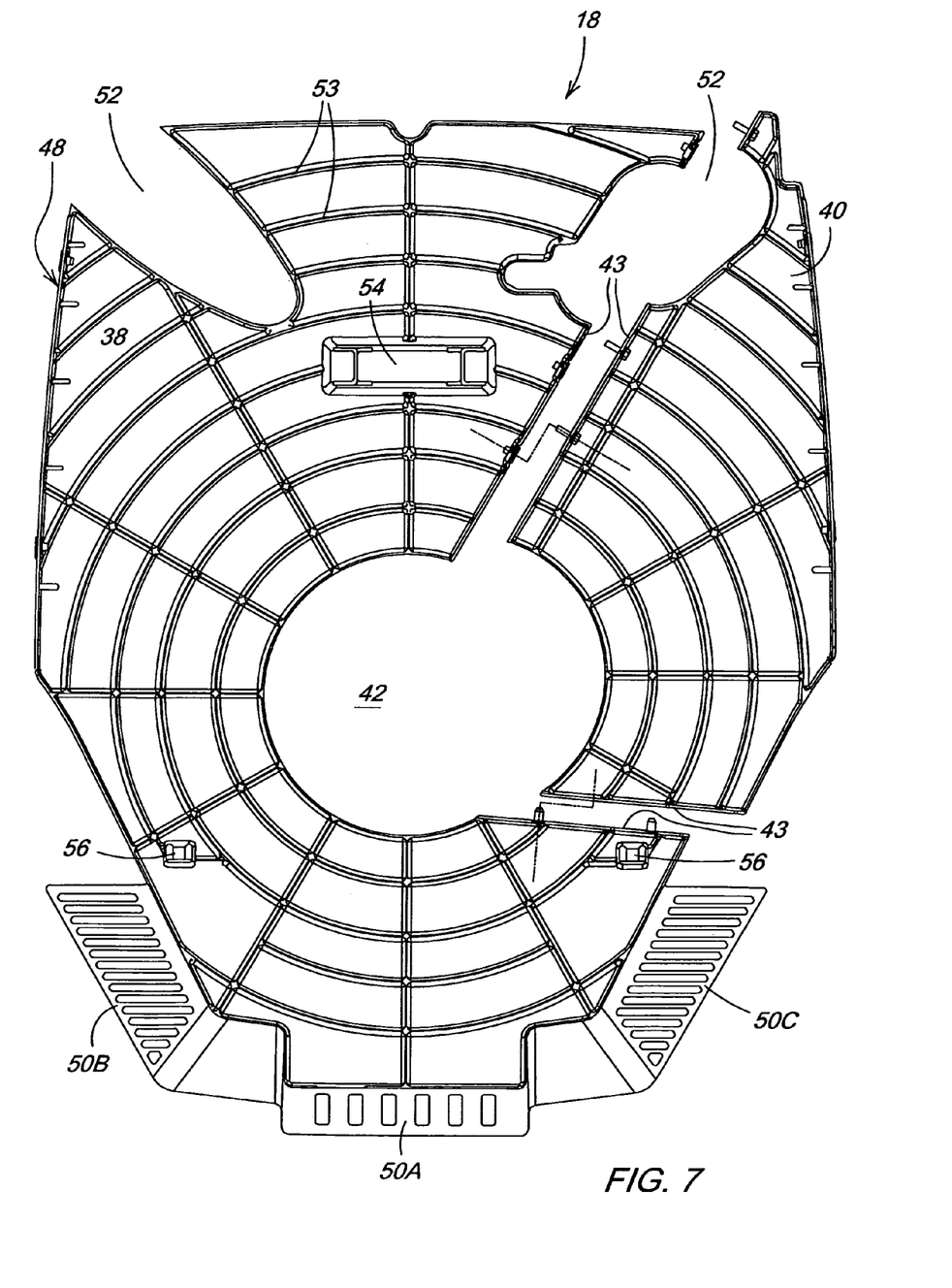
FIG. 7 is an exploded elevational view of a second side of the diverter plate according to invention.

The diverter plate 18 is illustrated in FIGS. 6 and 7. In a preferred embodiment the diverter plate 18 has a main section 38 and may also include a removable section 40. The removable section 40 is provided to facilitate servicing of the fan components and/or cleaning of the heat exchanger(s). Accordingly the main section 38 and removable section 40 are each provided with mating flanges 43 to facilitate attachment of the sections 38 and 40 to one another by way of appropriate fasteners (not shown). It is contemplated that the diverter plate 18 could be a unitary member and as such in the description that follows the diverter plate 18 will be referred to in its assembled state as though it were a unitary member. The diverter plate 18 may include a central aperture 42 surrounded by a generally flat peripheral area 44 which, when the diverter plate 18 is assembled to the vehicle, is generally perpendicular to the axis of the fan 14. The main body 46 of the diverter plate 18 extends angularly from the peripheral area 44. In the preferred embodiment he angle of the main body 46 is approximately 70 degrees from the axis of the fan 14 when the cooling package 10 is assembled to the vehicle. The diverter plate 18 further includes a pair of side flanges 48 (FIG. 2) extending perpendicularly from the peripheral area 44 outward from the main body 46. The side flanges 48 serve as a mounting surface for appropriate screens (not shown) fitted over the gap between the fan shroud 16 and the diverter plate 18 to prevent foreign objects from being introduced into the fan area even when the hood is opened. Diffuser screens 50 extend from the lower portion of the main body 46 as shown. The diffuser screens 50 are designed to abut the diverting surface 32 of the fan shroud 16 when the shroud 16 and diverter plate 18 are assembled to the vehicle. It is contemplated that the diffuser screens 50 can be molded integral with the diverter plate 18 or they could be separate parts or integral with the vehicle support or fan shroud. The diverter plate 18 may also include plumbing recesses and/or apertures 52 to facilitate routing of heat exchanger fluid lines under the hood. Depending upon the material selected for the diverter plate 18 it may further be desirable to include stiffening ribs 53 to increase the rigidity of the plate 18. The diverter plate 18 preferably includes means for mounting the plate 18 to the vehicle structure. In a preferred embodiment this is accomplished by a first mounting boss 54 located directly above the central aperture 42. The first mounting boss 54 is adapted to matingly fasten to a thermostat housing (not shown) bolted to the engine block. One or more additional mounting bosses 56 provide additional attachment points for affixing the diverter plate 18 to the front support of the vehicle (not shown).

Figure 8:
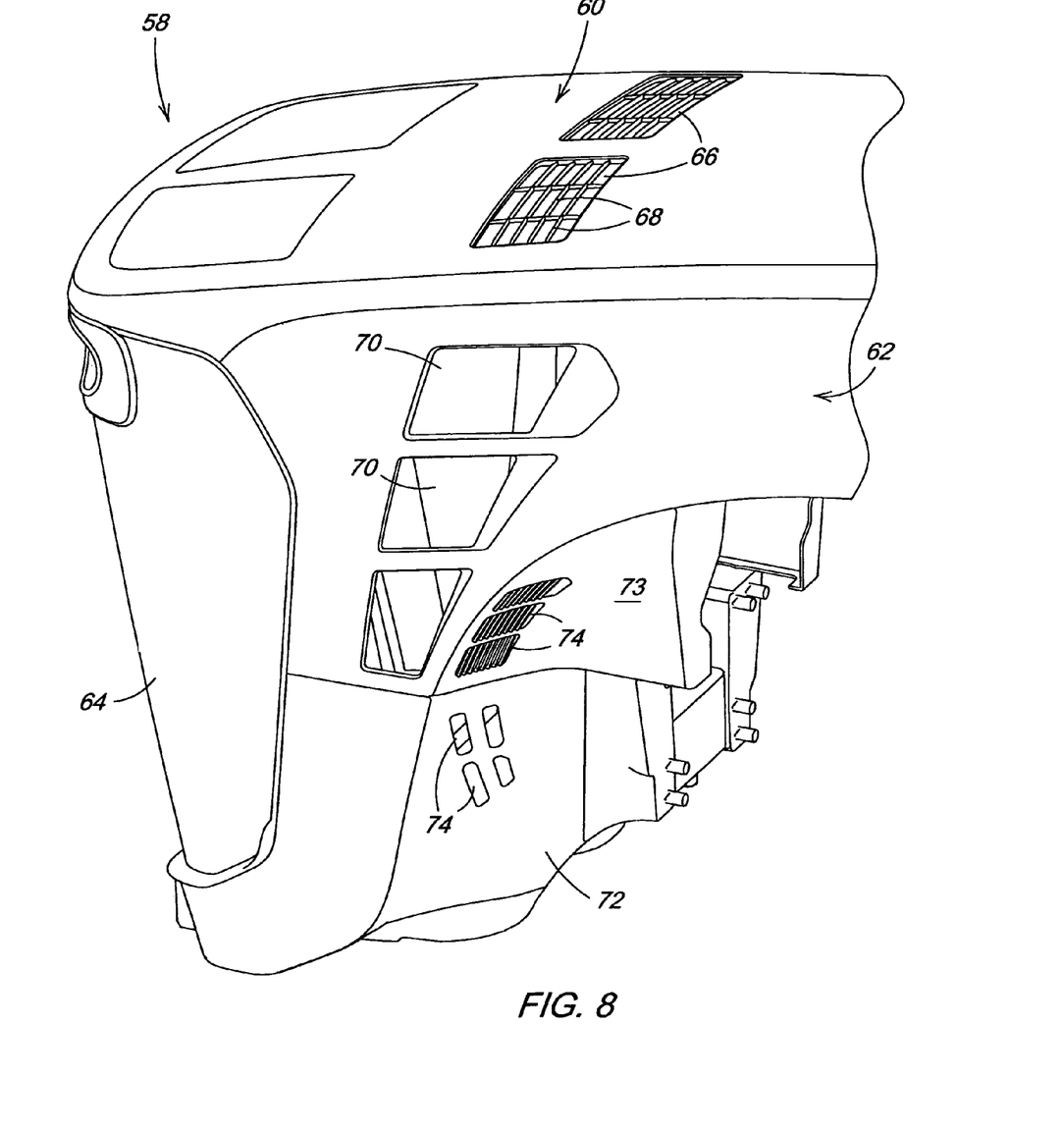
FIG. 8 is a perspective view of a portion of the vehicle hood and front support assembly according to the invention.

A vehicle hood assembly 58 is illustrated in FIG. 8. While the preferred embodiment describes a pivoting hood assembly which may be lifted to provide access to the under hood area, it is to be understood that the invention is applicable to other hood configurations including, but not limited to, fixed or removable hood assemblies. A portion of the hood assembly 58 is also shown in phantom in FIG. 1. As can be seen the hood assembly 58 generally includes an upper surface 60, a pair of opposed side surfaces 62 and a front radiator screen 64. For reasons which will become apparent as the description continues the upper surface 60 has one or more air discharge apertures 66. The air discharge apertures 66 are preferably fitted with screens or grids 68. Likewise the side surfaces 62 of the hood assembly 58 have one or more air discharge openings 70. The air discharge apertures 66 and air discharge openings 70 are located so as to correspond in location with the space between the diverting surface 32 of the fan shroud 16 and the diverter plate 18 when the hood assembly 58 is mounted to the vehicle and closed, as would be the case during normal operation of the vehicle. A vehicle front support 72 and wheel well louver 73 are also illustrated in FIG. 8. The front support 72 and wheel well louver 73 may each include one or more air discharge vents 74 which are also aligned generally with the space between the diverting surface 32 of the fan shroud 16 and the diverter plate 18. However the inclusion of air discharge vents 74 in the front support 72 or wheel well louver 73 is optional and should be based upon the particular need to maximize air discharge while minimizing ground debris disturbance.

As is perhaps best illustrated in FIG. 1, the diverting surface 32 of the fan shroud 16 and the diverter plate 18 both extend fully to the hood assembly 58 when the hood assembly 58 is mounted to the vehicle and the hood is closed. Accordingly, air being discharged from the fan 16 is predominately discharged from under the hood 58 through the air discharge apertures 66 and discharge openings 70 of the hood assembly 58 as well as through the air discharge vents 74 of the front support 72 and wheel well louver 73. A certain amount of air is allowed to circulate over the engine via the central aperture 42 of the diverter plate 18. It has been found that pulling some air through the center of fan from the engine compartment helps to cool the under hood area. It is contemplated that within the scope of the invention the diverter plate 18 could be made without the central aperture 42. A novel aspect of the present invention is that the air being discharged from the fan is expelled at a high velocity. This is possible due to the fact that the fan has a naturally radial discharge component of about 60 to 80 degrees. By matching the angles of the diverting surface 32 of the fan shroud 16 and the diverter plate 18 to the natural discharge angle of the fan 14, so as not to force a change in direction of the air leaving the fan, the air velocity is optimized. The high velocity of air exiting the vehicle ensures that air is jettisoned away from the vehicle as far as possible. Getting the air away from the vehicle reduces the recirculation affects of various head, tail and cross winds the vehicle may be operated in. Reducing the amount of air tunneling through the under hood area and generally being vectored toward the cab prevents additional cab heat loads which tend to burden both the vehicle cooling and air conditioning systems of the vehicle. Traditional thinking to date has been that fan exhaust airflow under the hood is beneficial for keeping under hood temperatures down, however use of the present invention proves the opposite to be true. Under hood temperatures are significantly reduced when the present invention is employed. It has also been found that noise levels of the vehicle are decreased when the present invention is used. This is attributed in part to the fact that backpressure on the fan is reduced by allowing air to be discharged at the natural fan discharge angle. The reduced backpressure on the fan also allows the fan to work more efficiently. While it is generally desirable to maximize the air velocity leaving the fan, it is desired to reduce the velocity of air being discharged from the lower side of the vehicle to prevent the stirring up of dust and debris from the ground which otherwise reduces visibility and fouls vehicle components. This reduced velocity is attained primarily by the increased resistance to air flow provided by the diffuser screens 50 extending between the diverter plate 18 and the diverting surface 32 of the fan shroud 16 at the lower edges thereof.

Figure 9:
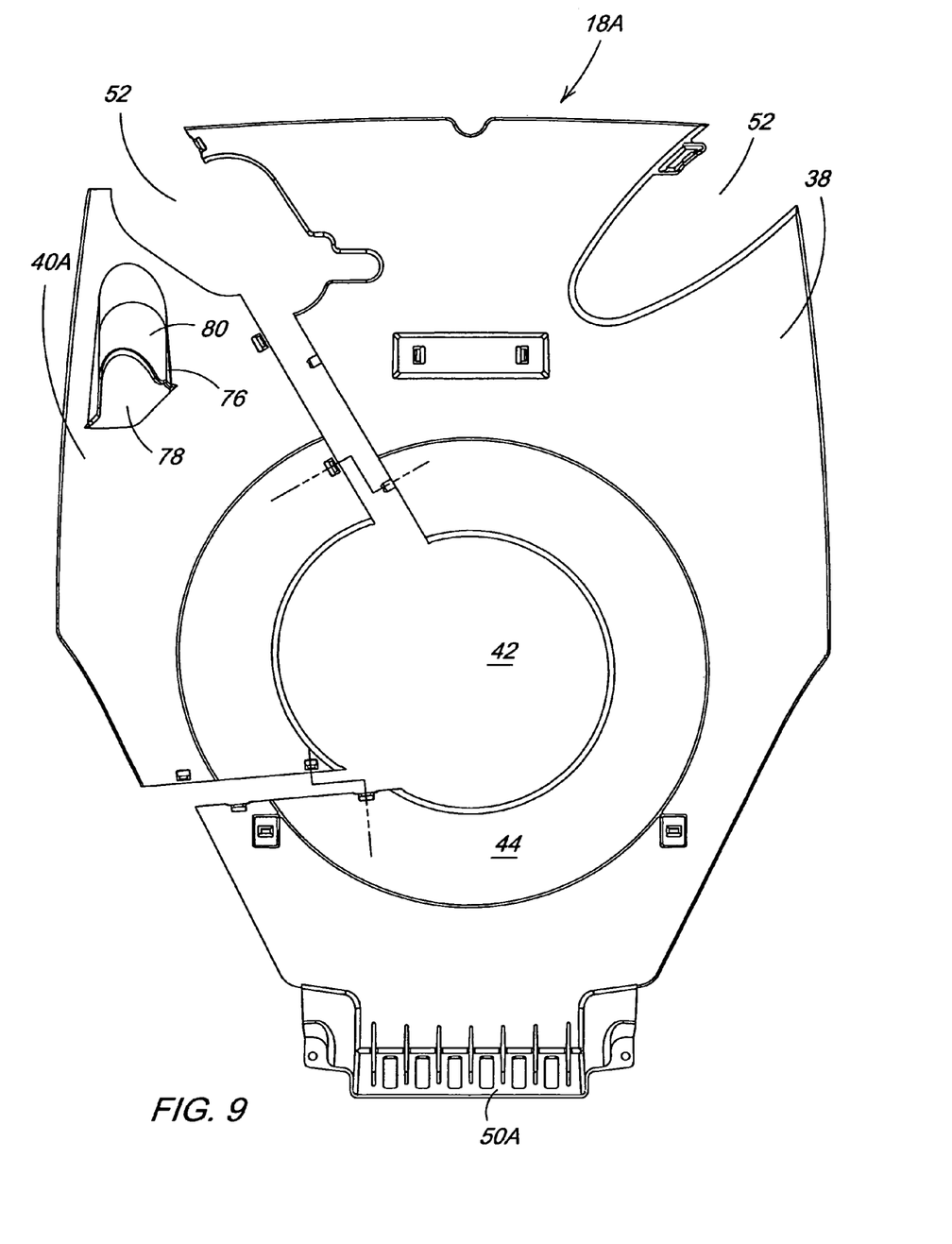
FIG. 9 is an exploded elevational view of a first side of an alternative embodiment diverter plate according to invention; and, FIG. 10 is an exploded elevational view of a second side of an alternative embodiment diverter plate according to invention.
Figure 10:
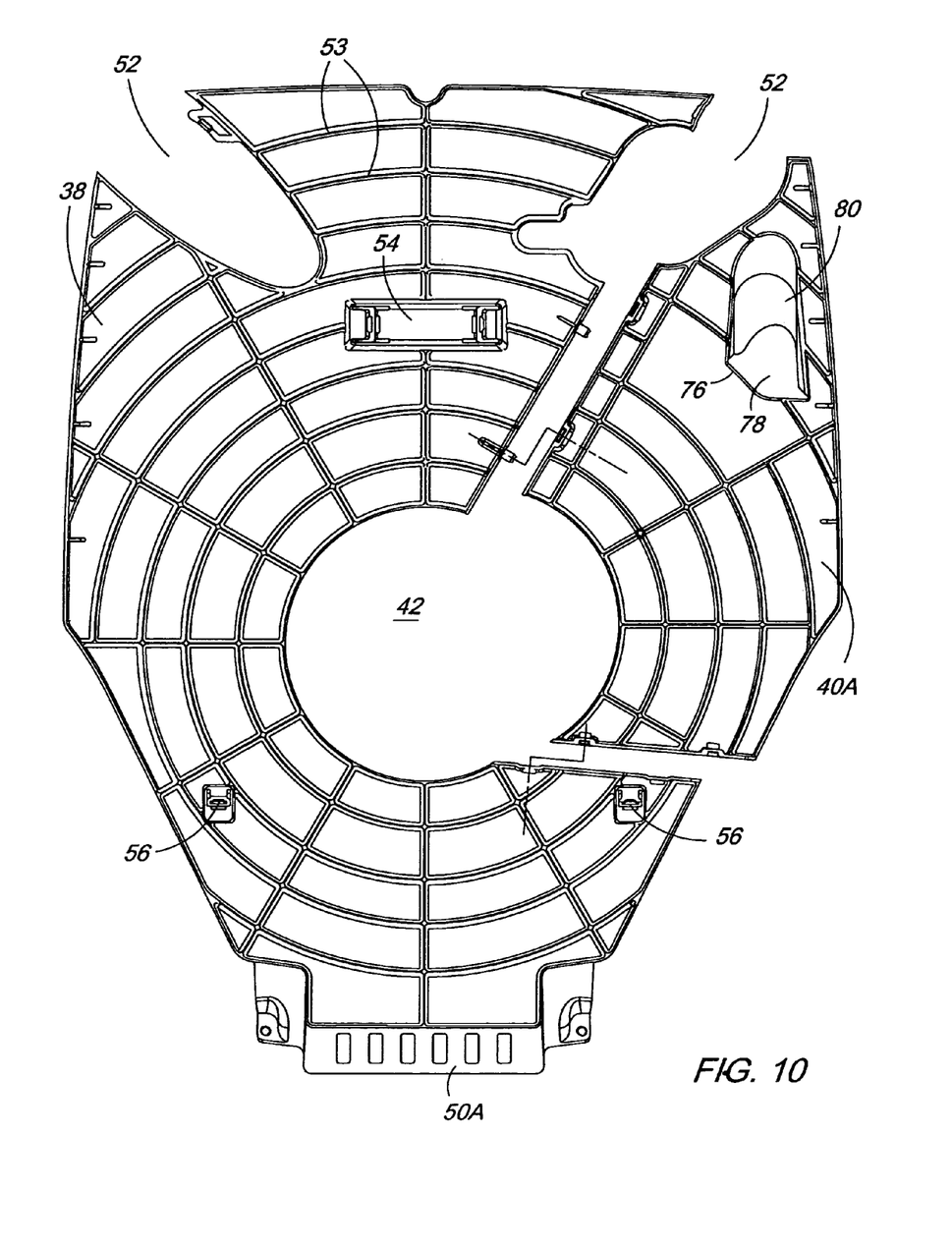

The general object of the present invention is to minimize the amount of hot air being circulated over the under hood components of the vehicle. This is the case because air being circulated under the hood provides little benefit unless it has a temperature substantially lower than the components over which it is being circulated. With this in mind those having skill in the art will recognize that circulating fan discharge air over certain high temperature components under the hood can provide some cooling benefits. Examples of such high temperature components are turbochargers or engine exhaust manifolds wherein even the heated air being discharged from the fan is substantially lower in temperature than the component temperature. Accordingly, an alternative embodiment of a diverter plate 18A is illustrated in FIGS. 9 and 10. As can be seen the diverter plate 18A is very similar to the diverter plate 18 illustrated in FIGS. 6 and 7 with the primary difference being that the diverter plate 18A includes a port 76 in the removable section 40A. The port 76 may be of any variety shapes depending on the application, but in the preferred embodiment includes an aperture 78 and a semi-cylindrical surface 80 which extends at angle from one side of the diverter plate 18A. The purpose of the port in the preferred embodiment is to direct a discrete flow of fan discharge air to a high temperature component, for example a turbocharger. Targeted cooling of the high temperature component can thus be achieved by direct plumbing from the port 76 to the component or by passive channeling of air to the component sometimes referred to in the relevant art as 'virtual ducting'. By utilizing such means it is possible to direct a portion of the fan discharge air to the high temperature component where it is most beneficial without generally circulating all of the fan discharge air over all of the under hood components. It should also be noted that FIGS. 9 and 10 illustrate the concept that the diffuser 50 need not be integrated with the diverter plate 18 as previously described. In FIGS. 9 and 10 only the bottom diffuser screen 50A is present while the side diffuser screens 50B and 50C are absent. It should be recognized that the diffuser screens 50 might also be entirely absent from the diverter plate 18 if it is desired to incorporate them in another component or to manufacture them as separate units. It should also be noted that the drawings of FIGS. 9 and 10 are used to illustrate one possible combination of diffuser screens 50 and the port 76 and those skilled in the art will recognize that different combinations are possible.

While the embodiment described herein utilizes a fan having a radial discharge component of 60-80 degrees and the diverting surface of the fan shroud and the diverter plate accordingly have angles of approximately 70 degrees these specific angles are described for purposes of illustration only. It is to be understood that different fans may have different discharge angles and that it is an object of the present invention to orient the diverting surface and diverter plate at as close to the natural discharge angle of the fan as possible without limitation to a specific angle or range of angles. The angle of the diverting surface and diverter plate is dependent upon the natural discharge angle of the particular fan selected for the particular application so that air flow direction is not changed unnecessarily, thereby allowing air to move more efficiently and at a higher velocity. Those having skill in the art will be able to determine the appropriate angles for the particular fan selected.

The heat exchanger(s) of the present invention are contained in a very tight configuration without much space between them. They are arranged such that air can pass through them in paths with as few obstructions as possible. Air passing through the heat exchanger(s) towards the fan experiences a high pressure drop due to friction with cooling fins of the heat exchanger(s). Thus there is negative pressure (vacuum) behind the heat exchanger(s) created by the fan's pumping action. This tends to draw air through the vehicle. It starts at standard pressure somewhere outside the vehicle and drops pressure due to friction in passing through the heat exchanger(s) until it reaches the fan. The high pressure drop at the fan works through the fans operating characteristics to produce the high velocity discharge at the natural fan discharge angle. Conventional cooling package arrangements have the fan located higher and further aft of the heat exchanger assembly than that of the present invention. The present invention's low and forward position of the fan relative to the heat exchanger assembly provides a path for the cooling air that is more direct or straight through the vehicle. The less need to change direction of air flow, the less power it takes to move it and the lower the noise will be. Having the cooling package low and forward allows the discharge air to better clear the front tires and other obstacles of the vehicle resulting in lower back pressure on the fan.

An alternative embodiment of the invention is contemplated wherein the diverter plate 18 does not extend fully to the hood 58 or there is a horizontal gap between the intersection of the hood 58 and the diverting surface 32 which is generally located at a rearward portion of the opening 66. By leaving such a gap a venturi effect created by air exiting the under hood area at the air discharge apertures 65 and air discharge openings 70 tends to draw some additional air from the under hood area to provide additional under hood cooling, while the diverter plate still serves to substantially prevent fan exhaust from circulating over the engine.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A vehicle cooling package comprising:
a heat exchanger assembly;
a fan shroud mounted to the heat exchanger assembly, the fan shroud having a diverting surface;
a diverter plate mounted adjacent to the fan shroud and spaced therefrom;
a fan interposed between the fan shroud and the diverter plate the fan having blades having a natural radial discharge component wherein air being discharged by blades is expelled generally radially; and,
a vehicle hood enclosing the heat exchanger assembly, the fan shroud, the diverter plate, and the fan, the hood having at least one surface having air discharge apertures corresponding with the space between the diverting surface and the diverter plate when the hood is closed;
the diverting surface of the fan shroud and the diverter plate each being angled from the axis of the fan when the fan shroud and diverter plate are assembled to the vehicle, so as to closely match the natural generally radial discharge angle of the fan blades, and the diverting surface and the diverter plate both extend toward the hood assembly when the hood is closed so that air is discharged from the fan at a high velocity from under the hood through the air discharge apertures and wherein a gap is provided between the hood and the diverter plate so that air is drawn from an engine compartment of the vehicle by a venturi effect of air exiting the hood enclosure at the air discharge apertures.

2. A vehicle cooling package according to claim 1 wherein the heat exchanger assembly is in fluid communication with an engine of a vehicle.

3. A vehicle cooling package according to claim 1 wherein the fan shroud has a fan aperture defined by a circumferential wall extending outwardly from a main body portion and the diverting surface extends from the circumferential wall opposite the main body portion.

4. A vehicle cooling package according to claim 1 wherein the diverter plate has a central aperture.

5. A vehicle cooling package according to claim 4 wherein the diverter plate is mounted to the vehicle structure by way of a first mounting boss located directly above the central aperture and one or more additional mounting bosses providing additional attachment points for affixing the diverter plate to a front support of the vehicle.

6. A vehicle cooling package according to claim 5 wherein the first mounting boss is adapted to matingly fasten to a thermostat housing bolted to an engine block of the vehicle.

7. A vehicle cooling package according to claim 1 wherein one or more diffuser screens are interposed between a lower portion of the diverter plate and the diverting surface of the fan shroud when the fan shroud and diverter plate are assembled to the vehicle.

8. A vehicle cooling package according to claim 1 wherein the heat exchanger assembly comprises one or more heat exchangers mounted to a frame.

9. A vehicle cooling package according to claim 8 wherein the fan shroud is mounted to the frame and provides a generally enclosed air passage between the heat exchanger(s) and the fan, which is partially disposed within the fan shroud.

10. A vehicle cooling package according to claim 8 wherein the fan shroud includes one or more mounting flanges adapted to mateably engage the heat exchanger frame.

11. A vehicle cooling package according to claim 1 wherein the fan shroud is a unitary member molded from a thermoset or thermoplastic material.

12. A vehicle cooling package according to claim 1 wherein the diverting surface and a main body portion of the fan shroud include stiffening ribs.

13. A vehicle cooling package according to claim 1 wherein the fan shroud has at least one plumbing recess.

14. A vehicle cooling package according to claim 1 wherein the diverter plate has a main section and a removable section.

15. A vehicle cooling package according to claim 14 wherein the main section and removable section are each provided with mating flanges to facilitate attachment of the sections to one another by way of fasteners.

16. A vehicle cooling package according to claim 1 wherein the diverter plate includes a pair of side flanges extending perpendicularly outward from a main body.

17. A vehicle cooling package according to claim 16 wherein the side flanges serve as a mounting surface for screens adapted to fit over a gap between the fan shroud and the diverter plate.

18. A vehicle cooling package according to claim 1 wherein the diverter plate includes at least one plumbing recess or aperture to facilitate routing of plumbing under the hood.

19. A vehicle cooling package according to claim 1 wherein the diverter plate includes stiffening ribs.

20. A vehicle cooling package according to claim 1 wherein the air discharge apertures of the hood are fitted with screens or grids.

21. A vehicle cooling package according to claim 1 wherein a vehicle front support has one or more air discharge vents which are generally aligned with a space between the diverting surface of the fan shroud and the diverter plate.

22. A vehicle cooling package according to claim 1 wherein a wheel well louver has one or more air discharge vents which are generally aligned with the space between the diverting surface of the fan shroud and the diverter plate.

23. A vehicle cooling package according to claim 1 wherein the fan blades have a radial discharge component of 60 to 80 degrees.

24. A vehicle cooling package according to claim 1 wherein a port is provided in the diverter plate for communicating fan discharge air directly to one or more pre-selected component(s).

* * * * *